US006628710B1

United States Patent
Llach-Pinsach et al.

(10) Patent No.: US 6,628,710 B1
(45) Date of Patent: Sep. 30, 2003

(54) AUTOMATIC EXTRACTION METHOD OF THE STRUCTURE OF A VIDEO SEQUENCE

(75) Inventors: Joan Llach-Pinsach, Barcelona (ES); Philippe Salembier, Esplugas (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 662 days.

(21) Appl. No.: 09/610,720

(22) Filed: Jul. 6, 2000

(30) Foreign Application Priority Data

Oct. 26, 1999 (EP) .......................................... 99402661
Jul. 6, 1999 (EP) .......................................... 99401684

(51) Int. Cl.[7] .............................................. H04N 7/12
(52) U.S. Cl. .............................. 375/240.08; 375/240.26
(58) Field of Search ...................... 375/240.08, 240.26; 382/170, 225, 226; 348/699.1, 700.1

(56) References Cited

U.S. PATENT DOCUMENTS

| | | | | | |
|---|---|---|---|---|---|
| 5,592,226 | A | * | 1/1997 | Lee et al. | 375/240.14 |
| 5,719,643 | A | * | 2/1998 | Nakajima | 348/700 |
| 5,774,593 | A | * | 6/1998 | Zick et al. | 382/236 |
| 5,828,809 | A | * | 10/1998 | Chang et al. | 386/69 |
| 5,835,163 | A | * | 11/1998 | Liou et al. | 348/700 |
| 5,835,667 | A | * | 11/1998 | Wactlar et al. | 386/96 |
| 5,956,026 | A | * | 9/1999 | Ratakonda | 345/723 |
| 6,195,458 | B1 | * | 2/2001 | Warnick et al. | 382/173 |
| 6,307,550 | B1 | * | 10/2001 | Chen et al. | 345/418 |
| 6,393,054 | B1 | * | 5/2002 | Altunbasak et al. | 375/240 |
| 6,411,724 | B1 | * | 6/2002 | Vaithilingam et al. | 382/100 |
| 6,473,459 | B1 | * | 10/2002 | Sugano et al. | 375/240.16 |

OTHER PUBLICATIONS

Yoshinobu Tonomura, Akihito Akutsu, Kiyotaka Otsuji, Toru Sadakata, VideoMAP and VideoSpaceIcon: Tools for Anatomizing Video Content, Apr. 29, 2003.*
Nevenka Dimitrova, Forouzan Golshani, Motion Recovery for Video Content Classification, 10/95.*
PHF 99,593 (Ser. No. 09/610,712).
R. Brunelli et al., "A Survey on the Automatic Indexing of Video Data", Journal of Visual Communication and Image Representation 10, 78–112 (1999).
Taehwan Shin et al, "Hierarchical Scene Change Detection in an MPEG–2 Compressed Video Sequence", 1998 Proceedings of the 1998 IEEE Int'l Symposium on Circuits and Systems, May 31–Jun. 3, 1998, Monterey, CA USA, pp. IV–253–256.

* cited by examiner

Primary Examiner—Chris Kelley
Assistant Examiner—David Czekaj
(74) Attorney, Agent, or Firm—Russell Gross

(57) ABSTRACT

The invention relates to a method intended to automatically create a description of a video sequence—i.e. its table of contents—, by means of an analysis of the sequence. The main steps of the method are a shot detection, a sub-division of these shots into sub-entities called micro-segments, and the creation of the final hierarchical structure of the processed sequence. According to the invention, the shot detection step computes the mean displaced frame difference curve, detects the highest peaks of said curve, removes, by filtering, some negative or positive peaks, extracts markers, and propagates them on the curve.

3 Claims, 7 Drawing Sheets

AUTOMATIC EXTRACTION METHOD OF THE STRUCTURE OF A VIDEO SEQUENCE

FIELD OF THE INVENTION

The invention relates to a method for an automatic extraction of the structure of a video sequence that corresponds to successive frames, comprising the following steps:

(1) a shot detection step, provided for detecting the boundaries between consecutive shots—a shot being a set of contiguous frames without editing effects—and using a similarity criterion based on a computation of the mean displaced frame difference curve and the detection of the highest peaks of said curve;

(2) a partitioning step, provided for splitting each shot into sub-entities, called micro-segments;

(3) a clustering step, provided for creating a final hierarchical structure of the processed video sequence.

The invention also relates to a corresponding method for indexing data, to a device for carrying out said method, and to an image retrieval system in which said method is implemented. The technique of the invention will be particularly well-suited for use in applications that are in relation with the MPEG-7 standard.

BACKGROUND OF THE INVENTION

The future MPEG-7 standard is intended to specify a standard set of descriptors that can be used to describe various types of multimedia information. The description thus associated with a given content allows fast and efficient searching for material of a user's interest. The invention relates more specifically to the case of representation of video sequences, intended to provide for users modalities of search information. For a video sequence, the goal of a table of contents description of this document is to define the structure of this sequence in a hierarchical fashion, similarly to what is done for books, in which texts are divided into chapters and paragraphs: the original sequence is subdivided into sub-sequences, which may be further divided into shorter sub-entities.

A method for defining such a structure is described in a european patent application previously filed by the Applicant with the number 99402594.8 (PHF99593). According to said document, the method is divided into three steps, which are, as shown in FIG. 1: a shot detection step 11 (in a sequence of pictures, a video shot is a particular sequence which shows a single background, i.e. a set of contiguous frames without editing effects), a partitioning step 12, for the segmentation of the detected shots into entities exhibiting consistent camera motion characteristics, and a shot clustering step 13.

Concerning the shot detection step, several solutions were already proposed in the document "A survey on the automatic indexing of video data", R. Brunelli and al., Journal of Visual Communication and Image Representation, volume 10, number 2, June 1999, pp. 58 78–112. In the method described in the cited document, the first step 11 detects the transitions between consecutive shots by means of two main sub-steps: a computation sub-step 111, allowing to determine a mean Displaced Frame Difference (mDFD) curve, and a segmentation sub-step 112.

The mDFD curve computed during the sub-step 111 is obtained taking into account both luminance and chrominance information. With, for a frame at time t, the following definitions:

$$\text{luminance } Y = \{f_k(i, j, t)\}_{k=Y} \quad (1)$$

$$\text{chrominance components } (U, V) = \{f_k(i, j, t)\}_{k=U, V} \quad (2)$$

the DFD is given by $$DFD_k(i,j; t-1, t+1) = f_k(i,j, t+1) - f_k(i-d_x(i,j), j-d_y(i,j), t-1) \quad (3)$$

and the mDFD by:

$$mDFD(t) = \frac{1}{I_x I_y} \sum_k^{Y,U,V} w_k \sum_{i,j}^{I_x I_y} |DFD_k(i, j; t-1, t+1)| \quad (4)$$

where $I_x$, $I_y$ are the image dimensions and $w_k$ the weights for Y, U, V components. An example of the obtained curve (and of the corresponding filtered one), showing ten shots $s_1$ to $s_{10}$, is illustrated in FIG. 2 with weights that have been for instance set to $\{w_Y, w_U, w_V\} = \{1, 3, 3\}$. In this example, the highest peaks of the curve correspond to the abrupt transitions from one frame to the following one (frames 21100, 21195, 21633, 21724), while, on the other side, the oscillation from frame 21260 to frame 21279 corresponds to a dissolve (a gradual change from one camera record to another one by simple linear combination of the frames involved in this dissolve process) and the presence of large moving foreground objects in frames 21100–21195 and 21633–21724 creates high level oscillations of the mDFD curve.

The sub-step 112, provided for detecting the video editing effects and segmenting the mDFD curve into shots, uses a threshold-based segmentation to extract the highest peaks of the mDFD curve (or another type of mono-dimensional curve), as described for instance in the document "Hierarchical scene change detection in an MPEG-2 compressed video sequence", T. Shin and al, Proceedings of the 1998 IEEE International Symposium on Circuits and Systems, ISCAS'98, vol.4, March 1998, pp.253–256.

The second step 12 is a temporal segmentation provided for splitting each detected shot into sub-entities presenting a very high level of homogeneity on camera motion parameters. It consists of two sub-steps: an oversegmentation sub-step 121, intended to dividing each shot into so-called micro-segments which must show a very high level of homogeneity, and a merging sub-step 122.

In order to carry out the first sub-step 121, it is necessary to define first what will be called a distance, (the distances thus defined allow to compare the micro-segments), and also a parameter allowing to assess the quality of a micro-segment or a partition (=a set of micro-segments). In both cases, a motion histogram, in which each one of the bins shows the percentage of frames with a specific type of motion and which is defined as indicated by the following relation (5), is used:

$$H_s[i] = \frac{N_i}{L_s} \quad (5)$$

where s represents the label of the concerned micro-segment inside the shot, i the motion type (these motions are called trackleft, trackright, boomdown, boomup, tiltdown, tiltup, panleft, panright, rollleft, rollright, zoomin, zoomout, fixed), $L_s$ the length of the micro-segment s, and $N_i$ the number of frames of the micro-segment s with motion type i (it is possible that $\Sigma H_s[i]>1$, since different motions can appear concurrently).

A micro-segment is assumed to be perfectly homogeneous (or to have a very high level of homogeneity) when it presents a single combination of camera motion parameters along all its frames, or to be not homogeneous when it presents important variations on these parameters. The micro-segment homogeneity is computed on its histogram (relation (5)): if a micro-segment is perfectly homogeneous, the histogram bins are equal either to 0 (the considered motion does not appear at all) or to 1 (the motion appears ont he whole segment), while if it is not, the bins can present intermediate values. The measure of the micro-segment homogeneity is then obtained by measuring how much its histogram differs from the ideal one (i.e. it is computed how much the bins of the histogram differ from 1 or 0). The distance corresponding to bins with high values is the difference between the bin value and 1; analogously, for bins with small values, the distance is the bin value itself. An example of histogram is shown in FIG. 3, the axes of which indicate for each motion type its proportion (=motion presence): two motion types introduce some error because the motion does not appear in all the frames of the micro-segment (panleft PL and zoomin ZI), and two other ones (boomdown BD and rollright RR) introduce some error for the opposite reason.

Mathematically, the homogeneity of a micro-segment s is given by the relation (6):

$$H(s) = \sum_i e(i) \qquad (6)$$

where:
$e(i)=1-H_s[i]$ if $H_s[i]$ 0,5
$e(i)=H_s[i]$ if $H_s[i]<0,5$
$H_s[i]$=histogram of the micro-segment s
i=motion type.

The homogeneity of a shot S is then equal to the homogeneity of its micro-segments, weighted by the length of each of them, as illustrated by the following equation (7):

$$H(S) = \frac{1}{L(S)} \cdot \sum_{j=1}^{j=N} L_j \cdot H(s_j) \qquad (7)$$

where $$L(S) = \sum_{1}^{N} L_j$$

is the total length of the shot S and N is the number of micro-segments said shot contains (it may be noted that small values of H(S) correspond to high levels of homogeneity). The distance between two micro-segments s1 and s2 is then the homogeneity of the micro-segments union:

$$d(s_1, s_2) = H(s_1 \cup s_2) \qquad (8)$$

The initial oversegmentation sub-step 121 therefore allows to oversegment the concerned shot in order to obtain a set of perfectly homogeneous micro-segments, which corresponds to the following relation (9):

$$H(s)=0, \text{whatever } s \text{ included in } S \qquad (9)$$

An example of how to obtain this initial oversegmented partition is shown in FIG. 4, with motion types panleft (PL), zoomout (ZO) and fixed (FIX), $s_1$ to $s_7$ designating the micro-segments (camera motion parameters may be unknown for some frames: in this example, the last frames of the shot—the segment $s_7$—do not have any parameter associated).

The merging sub-step 122 comprises a computation operation, in which the distance between all neighbouring micro-segments (temporally connected) is computed using the equation (8) for selecting the closest pair of micro-segments (for possible merging during the next operation), followed by a fusion decision operation, in which, in order to decide if the selected pair of micro-segments will be merged, the homogeneity of the shot (according to the equation (7)) is computed, assuming that the minimum distance micro-segments have already been merged. The following fusion criterion is applied:

merge if $H(S)$ threshold $T(H)$ do not merge if $H(S)$>threshold $T(H)$ (this fusion criterion is global: the decision depends on the homogeneity of the resulting partition, and not exclusively on the homogeneity of the resulting micro-segment). If the merging is done, a new iteration starts at the level of the second sub-step (a second computation operation is carried out, and so on . . . ). The merging process ends when there is no pair of neighbouring micro-segments that can still be merged.

The third step 13 is divided into two sub-steps: a shot merging sub-step 131, in which pairs of shots are grouped together for creating a binary tree, and a tree structuring sub-step 132, for restructuring said binary tree in order to reflect the similarities present in the video sequence.

The shot merging sub-step 131 is provided for yielding a binary tree which represents the merging order of the initial shots: the leaves represent these initial shots, the top node the whole sequence, and the intermediate nodes the sequences that are created by the merging of several shots. The merging criterion is defined by a distance between shots, and the closest shots are first merged. In order to compute the distance between shots, it is necessary to define a shot model providing the features to be compared and to set the neighbourhood links between them (which indicate what merging can be done). The process ends when all the initial shots have been merged into a single node or when the minimum distance between all couples of linked nodes is greater than a specified threshold.

The shot model must obviously allow to compare the content of several shots, in order to decide what shots must be merged and which is their merging order. In still images, luminance and chrominance are the main features of the image, while in a video sequence motion is an importance source of information due to the temporal evolution. So, average images, histograms of luminance and chrominance information (YUV components) and motion information will be used to model the shots.

For implementing the shot merging sub-step 131, it is necessary to carry out the following operations: (a) to get a minimum distance link (operation 1311), (b) to check a distance criterion (operation 1312); (c) to merge nodes (operation 1313); (d) to update links and distances (operation 1314); (e) to check the top node (operation 1315).

In the operation 1311, both the minimum and the maximum distance are computed for every pair of linked nodes. The maximum distance is first checked: if it is higher than a maximum distance threshold d(max), the link is discarded, otherwise the link is taken into account. Once all links have been scanned, the minimum distance is obtained.

In the operation 1312, in order to decide if the nodes pointed by the minimum distance link must be merged, the minimum distance is compared to a minimum distance threshold d(min): if it is higher than said threshold, no merging is performed and the process ends, otherwise pointed nodes are merged and the process goes on.

In the operation 1313, nodes pointed by the minimum distance links are merged. In the operation 1314, said links are updated to take into account the merging that has been done and, once links have been updated, the distance of those links which point to the new mode is recomputed. In the final operation 1315, the number of remaining nodes is checked: if all initial shots have been merged into a single node, the process ends, otherwise a new iteration begins.

The shot merging sub-step 131 may yield a single tree if all the initial shots are similar enough or a forest if initial shots are quite different. An example of binary tree for the creation of a table of contents is shown in FIG. 5. Inside the leaf nodes of this tree, its label and, between brackets, the starting and ending frame numbers of the shot have been indicated; inside the remaining nodes, the label, the fusion order (between parenthesis) and the minimum and maximum distance between its two siblings.

The tree restructuring sub-step 132 is provided for restructuring the binary tree obtained in the sub-step 131 into an arbitrary tree that should reflect more clearly the video structure: the nodes that have been created by the merging process but that do not convey any relevant information are removed, said removal being done according to a criterion based on the variation of the similarity degree (distance) between the shots included in the node:

if the analyzed node is the root node (or one of the root nodes if various binary trees have been obtained after the merging process), then the node should be preserved and appear in the final tree;

if the analyzed node is a leaf node (i.e. corresponds to an initial shot), then it has also to remain in the final tree;

otherwise, the node will be kept in the final tree only if the following conditions (10) and (11) are satisfied:

$$|d(min)[\text{analyzed node}]-d(min)[\text{parent node}]|<T(H) \quad (10)$$

$$|d(max)[\text{analyzed node}]-d(max)[\text{parent node}]|<T(H) \quad (11)$$

As shown in FIG. 6, the tree resulting from the restructuring sub-step 132 represents more clearly the structure of the video sequence: nodes in the second level of the hierarchy (28, 12, 13, 21) represent the four scenes of the sequence, while nodes in the third (or occasionally in the fourth) level represent the initial shots.

However, when implementing the method known from the cited document and hereinabove recalled, it may be noticed that this type of method is sometimes sensitive to noise, which then makes difficult to detect peaks of small contrast as those corresponding to fading or special effects.

SUMMARY OF THE INVENTION

It is therefore an object of the invention to propose a more robust method for creating the description of a video sequence, in which said limitation is no longer observed.

To this end, the invention relates to a method such as defined in the introductory paragraph of the description and which is moreover characterized in that the shot detection step includes an additional segmentation sub-step, applied to said means displaced frame difference curve and comprising the following operations:

(a) a first filtering operation, based on a structuring element removing the negative peaks the length of which is less than a predefined value (min);

(b) a second filtering operation, based on a contrast filter removing the positive peaks that have a positive contrast lower than a predefined value c;

(c) a marker extraction operation;

(d) a marker propagation operation.

BRIEF DESCRIPTION OF THE DRAWINGS

The present invention will now be described, by way of example, with reference to the accompanying drawings in which.

DETAILED DESCRIPTION OF THE INVENTION

Figure 1:
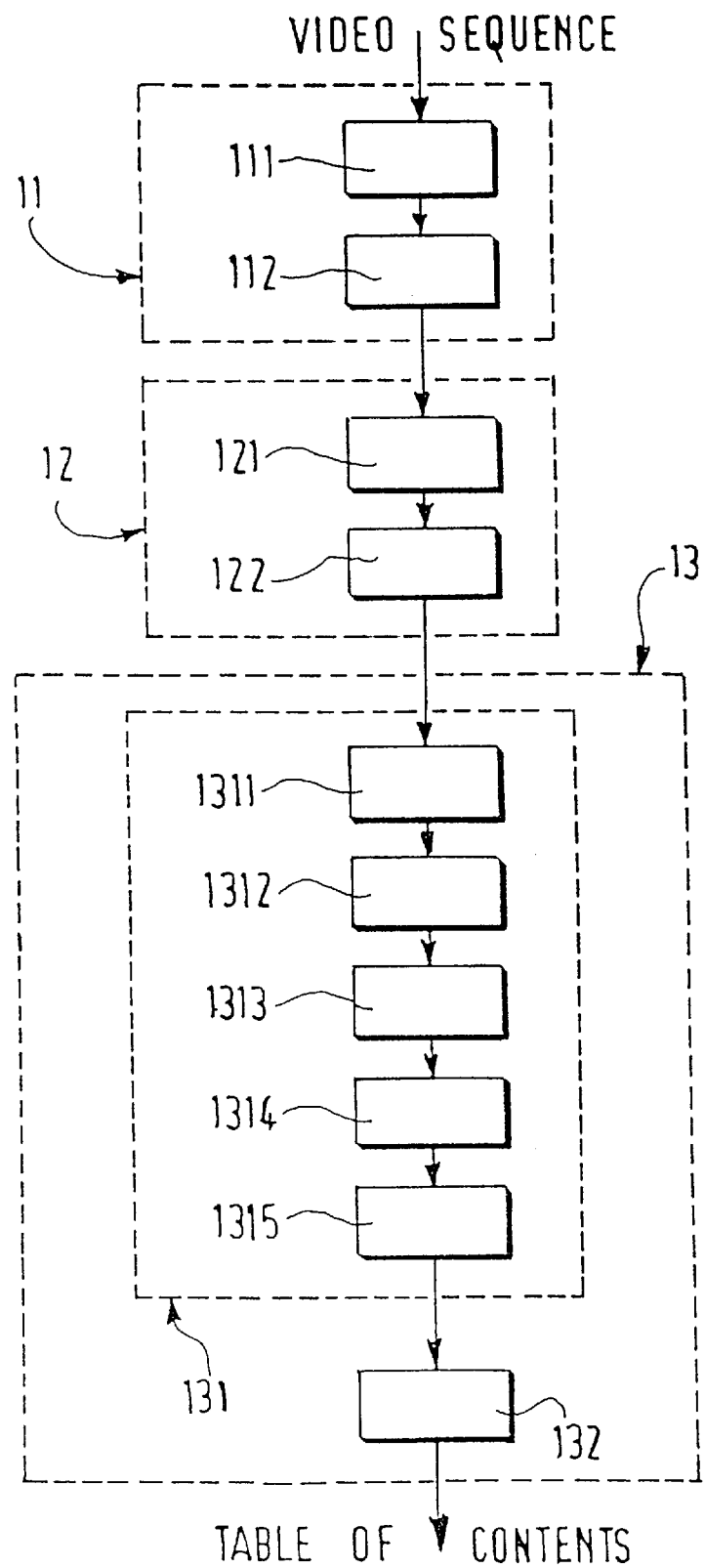
FIG. 1 shows a block diagram of the definition method described in the cited European patent application.
Figure 7:
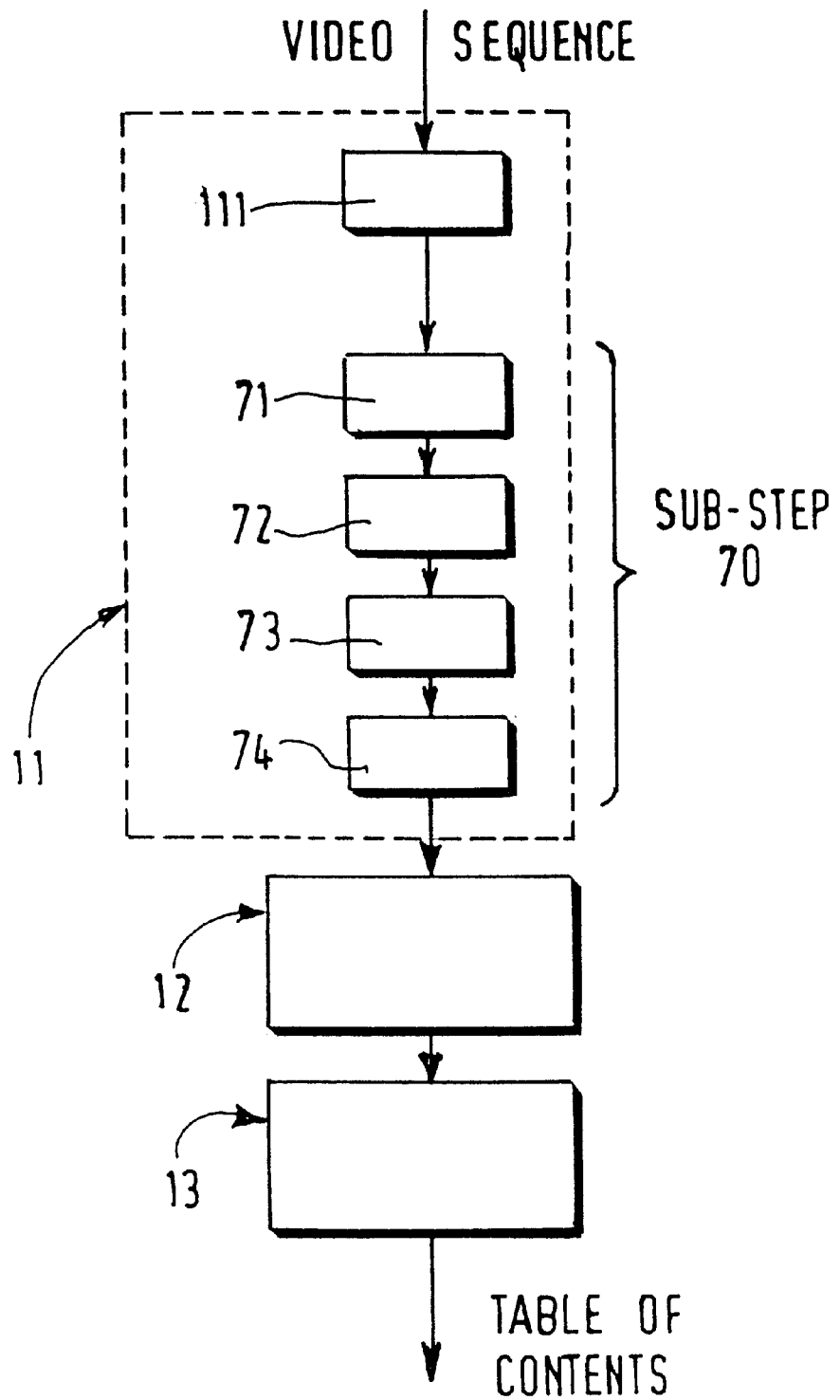
FIG. 7 shows a block diagram of the definition method when the technical solution according to the invention is now implemented.

It has been hereinabove indicated that the segmentation sub-step 112 allows to extract the highest peaks of the mDFD curve. Although a large number of shots can actually be detected by means of such an operation, it seems more difficult to detect peaks of small contrast. The proposed technical solution is the replacement of said operation by an homogeneity-based approach relying on morphological tools. According to said solution, and as illustrated in FIG. 7 which shows a block diagram of the definition method when the technical solution according to the invention is implemented, four successive operations constituting an improved segmentation sub-step 70 are successively applied to the mDFD curve. This sub-step 70 replaces the previous sub-step 112 of FIG. 1.

The first operation is a simplification operation 71, carried out by means of a temporal filtering, in the present case, a morphological closing with a mono-dimensional structuring element of length (min) equal to the duration of the shortest shot to be detected. With this operation, negative peaks the length of which is less than (min) frames are removed. The operation 71 is followed by another simplification operation 72, carried out by means of a positive contrast filter, the effect of which is to remove positive peaks that have a positive contrast lower than a given parameter c.

A marker extraction operation 73 is then provided. Each marker, corresponding to the kernel of one shot, must cover a position of the curve with a high probability to belong to a single shot. Because contiguous frames that belong to the same shot are quite similar, the value of the mDFD will be small around those frames. Thus, to extract the markers, a negative contrast filter (with the same parameter c as in the previous operation 72) is used for detecting each relative minimum of the curve. A final operation 74 allows to propagate the markers on the curve until all points are assigned to a marker. This propagation process is performed by applying for instance the well known watershed algorithm on the mDFD curve using as initial markers those obtained in the previous operation 73.

Figure 2:
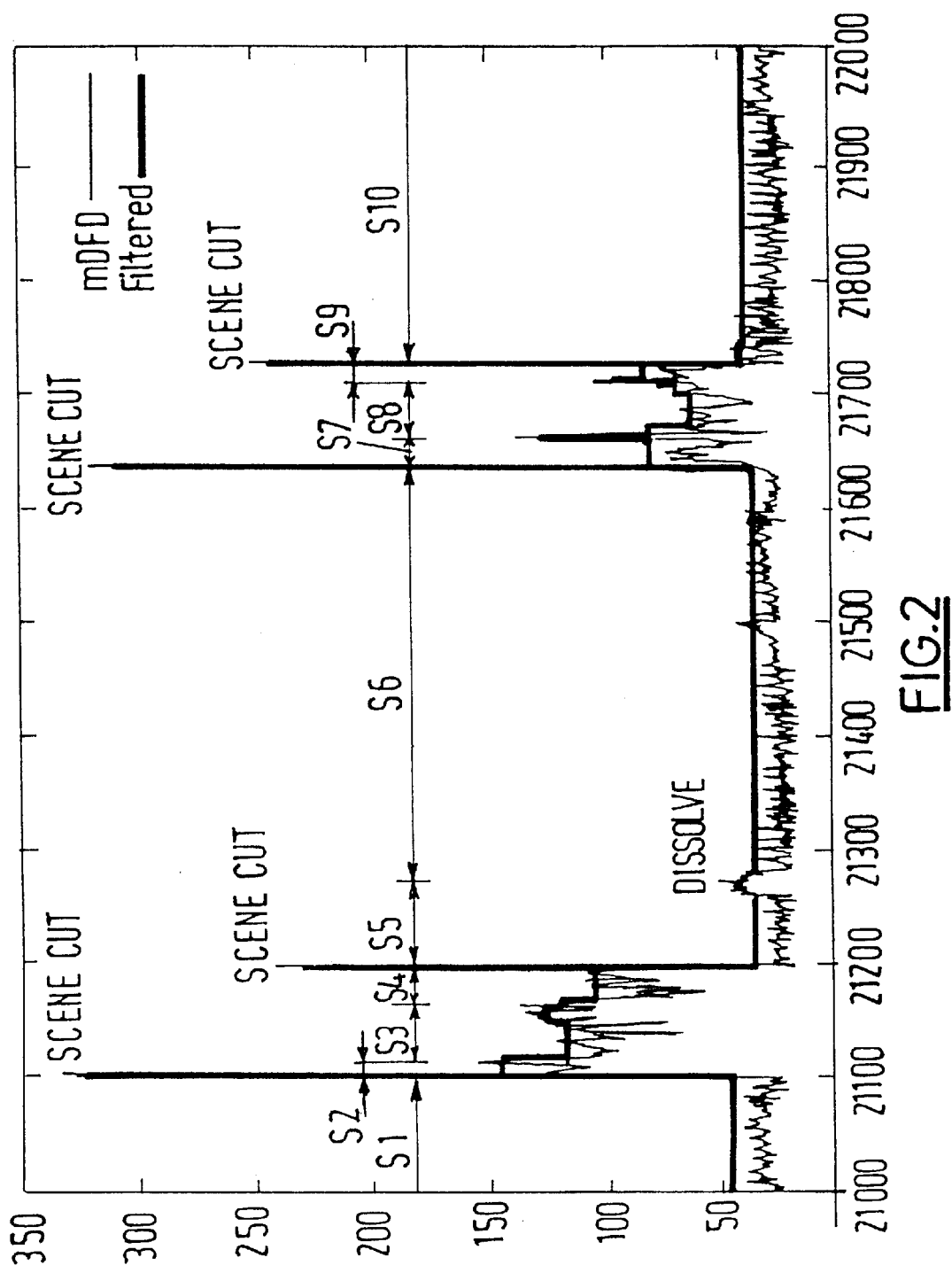
FIG. 2 illustrates an example of mDFD curve for a given sequence of frames.
Figure 3:
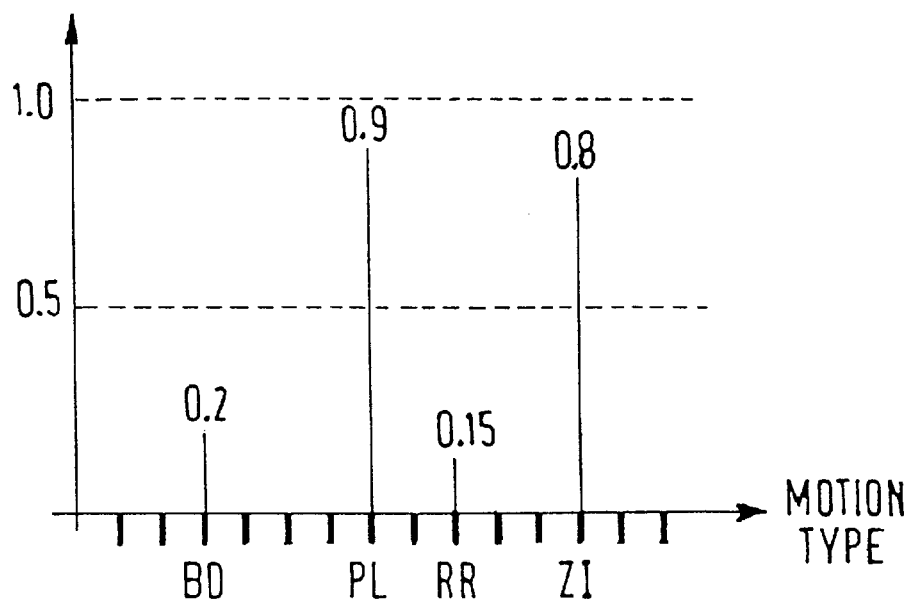
FIG. 3 shows an example of histogram illustrating the measure of the homogeneity.
Figure 4:
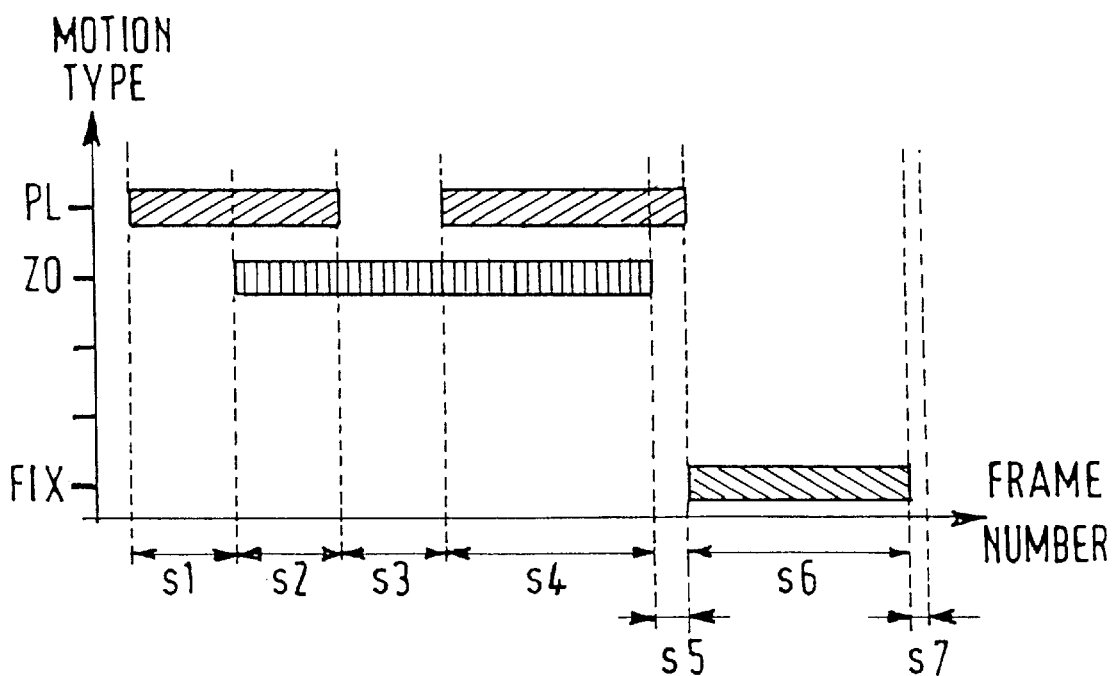
FIG. 4 illustrates a sub-step of the above-described definition method.
Figure 5:
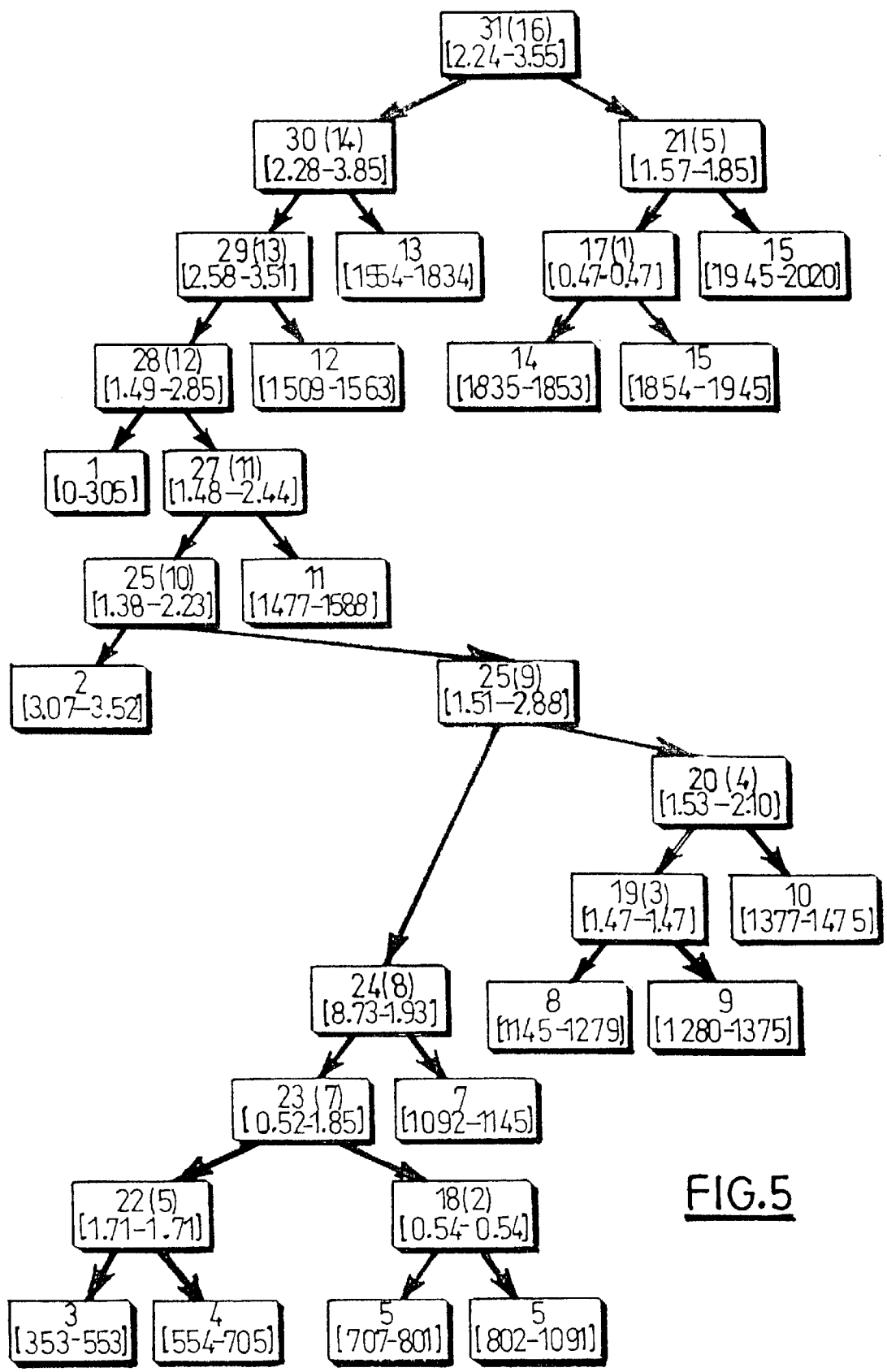
FIG. 5 shows a binary tree such as created by implementation of a shot merging sub-step provided in said definition method.
Figure 6:
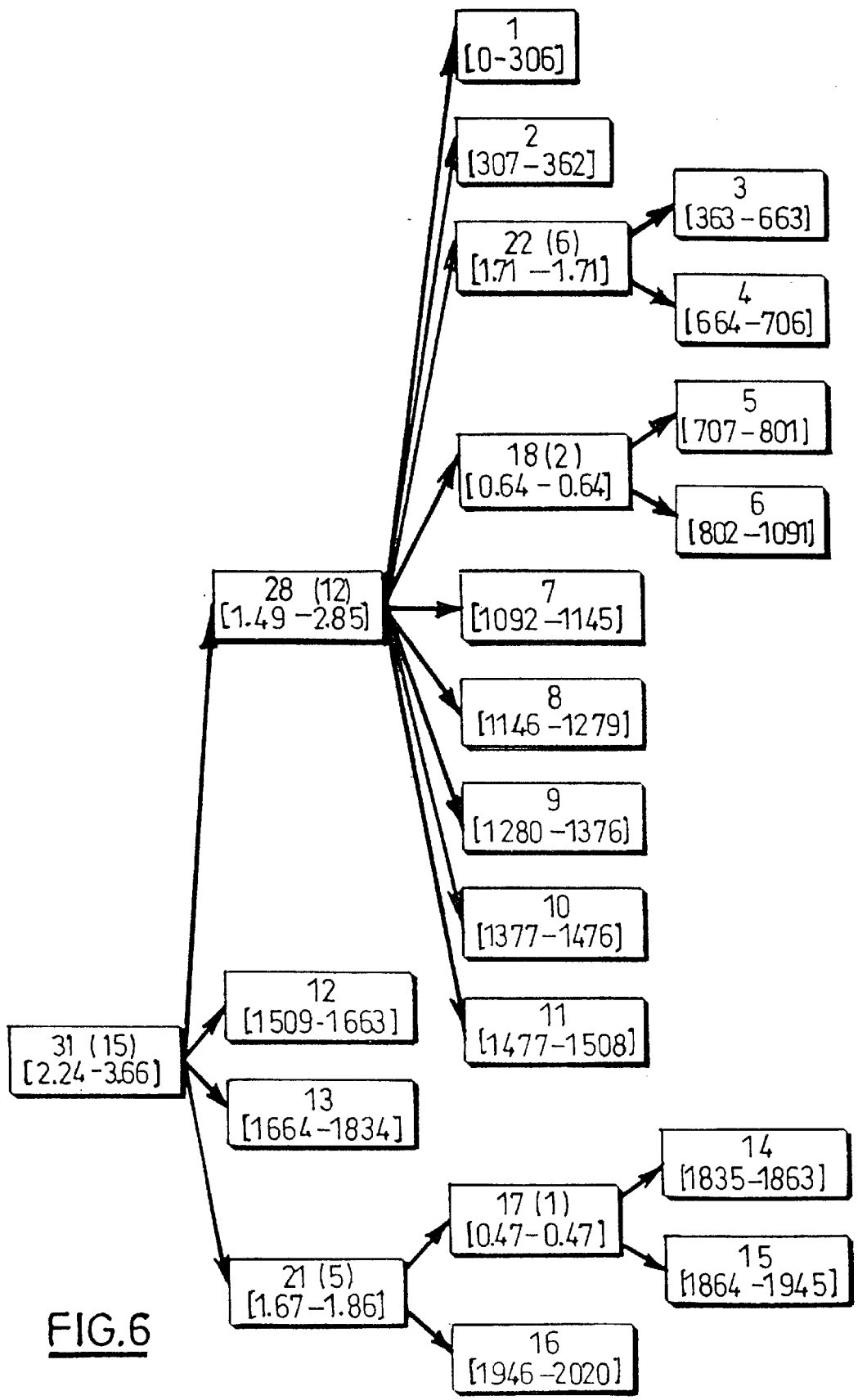
FIG. 6 shows the tree yielded after a restructuring sub-step of said definition method.

In the example of filtered curve of FIG. 2, the resulting markers and detected shots use (min)=10 and c=10. Even though some oversegmentation appears around frames 21150 and 21700, both the scene cuts and the dissolve have been correctly detected. Such an oversegmentation is not a problem, because it will be eliminated during the next steps 12 and 13 of the method.

Figure 8:
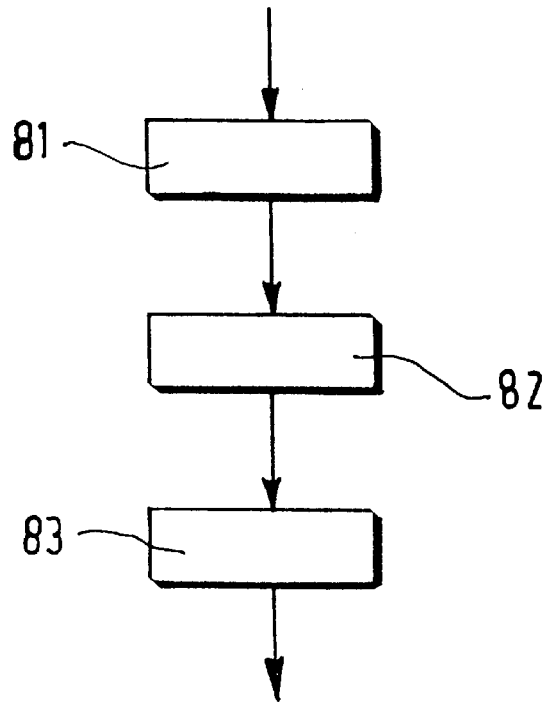
FIG. 8 illustrates a method for indexing data that have been processed according to the invention.

The invention is not limited to the implementation described above, from which modifications or broader applications may be deduced without departing from the scope of the invention. For instance the invention also relates to a method for indexing data that have been processed according to the previously described method. Such a method, illustrated in FIG. 8, comprises a structuring step 81, carrying out a sub-division of each processed sequence into consecutive shots and the splitting of each of the obtained shots into sub-entities (or micro-segments), and a clustering step 82, creating the final hierarchical structure. These steps 81 and 82, respectively similar to the steps 11–12 and to the step 13 previously described, are followed by an additional indexing step 83, provided for adding a label to each element of the hierarchical structure defined for each processed video sequence.

Figure 9:
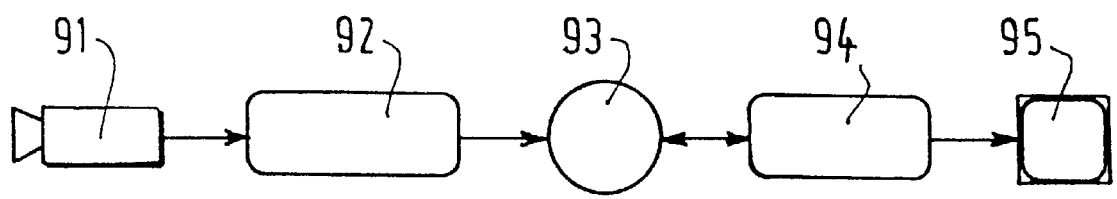
FIG. 9 illustrates an image retrieval system implementing said indexing method and allowing to perform an image retrieval.

The invention also relates to an image retrieval system such as illustrated in FIG. 9, comprising a camera 91, for the acquisition of the video sequences (available in the form of sequential video bitstreams), a video indexing device 92, for carrying out said data indexing method (said device captures the different levels of content information in said sequences by analysis, hierarchical segmentation, and indexing on the basis of the categorization resulting from said segmentation), a database 93 that stores the data resulting from said categorization (these data are sometimes called metadata), a graphical user interface 94, for carrying out the requested retrieval from the database, and a video monitor 95 for displaying the retrieved information. The invention also relates, obviously, to the video indexing device 92, that allows to implement the method according to the invention.

What is claimed is:

1. A method for an automatic extraction of the structure of a video sequence that corresponds to successive frames, comprising the following steps:

(1) a shot detection step, provided for detecting the boundaries between consecutive shots—a shot being a set of contiguous frames without editing effects—and using a similarity criterion based on a computation of the mean displaced frame difference curve and the detection of the highest peaks of said curve;

(2) a partitioning step, provided for splitting each shot into sub-entities, called micro-segments;

(3) a clustering step, provided for creating a final hierarchical structure of the processed video sequence;

wherein said detection step includes an additional segmentation sub-step, applied to said means displaced frame difference curve and comprising the following operations:

(a) a first filtering operation, based on a structuring element removing the negative peaks the length of which is less than a predefined value (min);

(b) a second filtering operation, based on a contrast filter removing the positive peaks that have a positive contrast lower than a predefined value c;

(c) a marker extraction operation;

(d) a marker propagation operation.

2. A method according to claim 1, wherein said marker extraction operator is implemented by means of a negative contrast filter using the same predefined value c.

3. A method according to claim 2, wherein said marker propagation operation is performed by applying the so-called watershed method.

* * * * *